United States Patent

Steely, Jr. et al.

[19]

[11] Patent Number: 6,088,771
[45] Date of Patent: *Jul. 11, 2000

[54] MECHANISM FOR REDUCING LATENCY OF MEMORY BARRIER OPERATIONS ON A MULTIPROCESSOR SYSTEM

[75] Inventors: Simon C. Steely, Jr., Hudson, N.H.; Madhumitra Sharma, Shrewsbury, Mass.; Kourosh Gharachorloo, Stanford, Calif.; Stephen R. Van Doren, Northborough, Mass.

[73] Assignee: Digital Equipment Corporation, Maynard, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/957,501

[22] Filed: Oct. 24, 1997

[51] Int. Cl.[7] ........................................... G06F 13/00
[52] U.S. Cl. ...................... 711/154; 711/147; 711/163; 709/213; 709/248; 712/225
[58] Field of Search ..................... 711/147, 150, 711/151, 152, 154, 163, 156, 158, 168; 709/213, 248, 201; 712/225, 16

[56] References Cited

U.S. PATENT DOCUMENTS

| | | | |
|---|---|---|---|
| 5,193,167 | 3/1993 | Sites et al. | 711/163 |
| 5,414,848 | 5/1995 | Sandage et al. | 709/107 |
| 5,504,900 | 4/1996 | Raz | 707/10 |
| 5,546,582 | 8/1996 | Brockmeyer et al. | 709/300 |
| 5,551,005 | 8/1996 | Sarangdhar et al. | 711/145 |
| 5,761,731 | 6/1998 | Van Doren et al. | 711/155 |
| 5,787,480 | 7/1998 | Scales et al. | 711/148 |
| 5,841,973 | 11/1998 | Kessler et al. | 709/250 |
| 5,845,331 | 12/1998 | Carter et al. | 711/163 |
| 5,867,649 | 2/1999 | Larson | 709/201 |

OTHER PUBLICATIONS

Shared Memory Consistency Models: A Tutorial, Sarita V. Adve, et al., Western Research Laboratory, 1995, pp. 1–28.

*Primary Examiner*—Eddie P. Chan
*Assistant Examiner*—Hong C. Kim
*Attorney, Agent, or Firm*—Cesari & McKenna, LLP

[57] ABSTRACT

A technique reduces the latency of a memory barrier (MB) operation used to impose an inter-reference order between sets of memory reference operations issued by a processor to a multiprocessor system having a shared memory. The technique comprises issuing the MB operation immediately after issuing a first set of memory reference operations (i.e., the pre-MB operations) without waiting for responses to those pre-MB operations. Issuance of the MB operation to the system results in serialization of that operation and generation of a MB Acknowledgment (MB-Ack) command. The MB-Ack is loaded into a probe queue of the issuing processor and, according to the invention, functions to pull-in all previously ordered invalidate and probe commands in that queue. By ensuring that the probes and invalidates are ordered before the MB-Ack is received at the issuing processor, the inventive technique provides the appearance that all pre-MB references have completed.

7 Claims, 5 Drawing Sheets

MECHANISM FOR REDUCING LATENCY OF MEMORY BARRIER OPERATIONS ON A MULTIPROCESSOR SYSTEM

FIELD OF THE INVENTION

The invention relates to multiprocessor systems and, more particularly, to the efficient ordering of memory reference operations issued by a processor of a multiprocessor system.

BACKGROUND OF THE INVENTION

Multiprocessing systems, such as symmetric multi-processors, provide a computer environment wherein software applications may operate on a plurality of processors using a single address space or shared memory abstraction. In a shared memory system, each processor can access any data item without a programmer having to worry about where the data is or how to obtain its value; this frees the programmer to focus on program development, e.g., algorithms, rather than managing partitioned data sets and communicating values. Interprocessor synchronization is typically accomplished in a shared memory system between processors performing read and write operations to "synchronization variables" either before and after accesses to "data variables".

For instance, consider the case of a processor P1 updating a data structure and processor P2 reading the updated structure after synchronization. Typically, this is accomplished by P1 updating data values and subsequently setting a semaphore or flag variable to indicate to P2 that the data values have been updated. P2 checks the value of the flag variable and, if set, subsequently issues read operations (requests) to retrieve the new data values. Note the significance of the term "subsequently" used above; if P1 sets the flag before it completes the data updates or if P2 retrieves the data before it checks the value of the flag, synchronization is not achieved. The key is that each processor must individually impose an order on its memory references for such synchronization techniques to work. The order described above is referred to as a processor's inter-reference order. Commonly used synchronization techniques require that each processor be capable of imposing an inter-reference order on its issued memory reference operations.

| P1 | | | P2 | | |
|---|---|---|---|---|---|
| Store | Data, New-value | | L1: | Load | Flag |
| Store | Flag, 0 | | | BNZ | L1 |
| | | | | Load | Data |

*The inter-reference order imposed by a processor is defined by its memory reference ordering model or, more commonly, its consistency model. The consistency model for a processor architecture specifies, in part, a means by which the inter-reference order is specified. Typically, the means is realized by inserting a special memory reference ordering instruction, such as a Memory Barrier (MB) or "fence", between sets of memory reference instructions. Alternatively, the means may be implicit in other opcodes, such as in "test-and-set". In addition, the model specifies the precise semantics (meaning) of the means. Two commonly used consistency models include sequential consistency and weak-ordering, although those skilled in the art will recognize that there are other models that may be employed, such as release consistency.

Sequential Consistency

In a sequentially consistent system, the order in which memory reference operations appear in an execution path of the program (herein referred to as the "I-stream order") is the inter-reference order. Additional instructions are not required to denote the order simply because each load or store instruction is considered ordered before its succeeding operation in the I-stream order.

Consider the program example below. The program performs as expected on a sequentially consistent system because the system imposes the necessary inter-reference order. That is, P1's first store instruction is ordered before P1's store-to-flag instruction. Similarly, P2's load flag instruction is ordered before P2's load data instruction. Thus, if the system imposes the correct inter-reference ordering and P2 retrieves the value 0 for the flag, P2 will also retrieve the new value for data.

Weak Ordering

In a weakly-ordered system, an order is imposed between selected sets of memory reference operations, while other operations are considered unordered. One or more MB instructions are used to indicate the required order. In the case of an MB instruction defined by the Alpha® 21264 processor instruction set, the MB denotes that all memory reference instructions above the MB (i.e., pre-MB instructions) are ordered before all reference instructions after the MB (i.e., post-MB instructions). However, no order is required between reference instructions that are not separated by an MB.

| P1: | | | P2: | | |
|---|---|---|---|---|---|
| Store | Data1, New-value1 | | L1: | Load | Flag |
| Store | Data2, New-value2 | | | BNZ | L1 |
| MB | | | | MB | |
| Store | Flag, 0 | | | Load | Data1 |
| | | | | Load | Data2 |

In above example, the MB instruction implies that each of P1's two pre-MB store instructions are ordered before P1's store-to-flag instruction. However, there is no logical order required between the two pre-MB store instructions. Similarly, P2's two post-MB load instructions are ordered after the Load flag; however, there is no order required between the two post-MB loads. It can thus be appreciated that weak ordering reduces the constraints on logical ordering of memory references, thereby allowing a processor to gain higher performance by potentially executing the unordered sets concurrently.

The prior art includes other types of barriers as described in literature and as implemented on commercial processors. For example, a write-MB (WMB) instruction on an Alpha microprocessor requires only that pre-WMB store instructions be logically ordered before any post-WMB stores. In other words, the WMB instruction places no constraints at all on load instructions occurring before or after the WMB.

In order to increase performance, modern processors do not execute memory reference instructions one at a time. It is desirable that a processor keep a large number of memory references outstanding and issue, as well as complete, memory reference operations out-of-order. This is accomplished by viewing the consistency model as a "logical order", i.e., the order in which memory reference operations appear to happen, rather than the order in which those references are issued or completed. More precisely, a consistency model defines only a logical order on memory references; it allows for a variety of optimizations in implementation. It is thus desired to increase performance by reducing latency and allowing (on average) a large number of outstanding references, while preserving the logical order implied by the consistency model.

In prior systems, a memory barrier instruction is typically contingent upon "completion" of an operation. For example, when a source processor issues a read operation, the operation is considered complete when data is received at the source processor. When executing a store instruction, the source processor issues a memory reference operation to acquire exclusive ownership of the data; in response to the issued operation, system control logic generates "probes" to invalidate old copies of the data at other processors and to request forwarding of the data from the owner processor to the source processor. Here the operation completes only when all probes reach their destination processors and the data is received at the source processor.

Broadly stated, these prior systems rely on completion to impose inter-reference ordering. For instance, in a weakly-ordered system employing MB instructions, all pre-MB operations must be complete before the MB is passed and post-MB operations may be considered. Essentially, "completion" of an operation requires actual completion of all activity, including receipt of data and acknowledgments for probes, corresponding to the operation. Such an arrangement is inefficient and, in the context of inter-reference ordering, adversely affects latency.

Therefore, the present invention is directed to increasing the efficiency of a shared memory multiprocessor system by relaxing the completion requirement while preserving the consistency model. The invention is further directed to improving the performance of a shared memory system by reducing the latency associated with memory barriers.

SUMMARY OF THE INVENTION

The invention relates to a technique for reducing the latency of a memory barrier (MB) operation used to impose an inter-reference order between sets of memory reference operations issued by a processor to a multiprocessor system having a shared memory. The technique comprises issuing the MB operation immediately after issuing a first set of memory reference operations (i.e., the pre-MB operations) without waiting for responses to those pre-MB operations, thereby reducing the latency of the MB operation.

In the illustrative embodiment, inter-reference ordering is imposed by a MB instruction inserted between memory reference instructions of a program executed by a processor. Orderly execution of these instructions within the processor may cause out-of-order issuance and completion of external memory reference operations due to operational latencies throughout the system. To ensure shared memory consistency, prior systems inhibit program execution past the MB instruction until actual completion of pre-MB operations have been confirmed to the processor. According to the present invention, however, program execution may proceed past the MB instruction once it appears that all pre-MB operations have completed.

The multiprocessor control logic totally orders all operations issued by all processors to the system. Ordering of memory reference operations by the system control logic results in the generation and transmission of invalidate and probe commands to one or more other processors. These commands are loaded into probe queues to those processors. Ordering of the MB operation by the system control logic results in the generation of a MB Acknowledgment (MB-Ack) command. The MB-Ack is loaded into a probe queue of the issuing processor and, according to the invention, functions to "pull-in" all previously loaded invalidate and probe commands in that queue.

For example, consider the case of a processor PI issuing an MB operation to the system. If the MB operation is ordered by the system control logic after a memory reference operation from a processor P2, then a probe or invalidate command resulting from the memory reference operation is loaded into P1's probe queue before the MB-Ack is loaded into P1's probe queue. This ensures that the memory reference operation appears completed to P1 when P1 receives the MB-Ack.

As described herein, a local switch interconnects the processor and shared memory entities of the multiprocessor system. The switch includes a plurality of input and output queue sets, each of which is coupled to a processor and each of which includes a probe queue. Each processor preferably has a private cache for storing data and changes to the data as a result of the memory reference operations are reflected among the entities via the transmission of probe signals through the probe queues in accordance with a conventional cache coherence protocol. Associated with each switch is an ordering point that serializes memory reference operations, including the MB operation, issued to the system and generates the MB-Ack in response to the MB operation.

Specifically, each memory reference operation is loaded into an input queue of the switch in the order issued by a processor. An arbiter of the switch arbitrates among all of the input queues to grant access to the ordering point where the operations are serialized ("ordered") into a memory reference request stream. Upon ordering of the MB operation, the ordering point generates an MB-Ack and atomically loads it into the probe queue of the issuing processor. As a result of the atomic ordering process, the MB-Ack is loaded into the probe queue after all previously ordered invalidates and probes directed to the processor's cache; thus, the previously ordered invalidates and probes are applied to the processor's cache before the MB-Ack is received by the processor. Upon receiving the MB-Ack, the issuing processor continues program execution beyond the MB instruction.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF THE ILLUSTRATIVE EMBODIMENTS

Figure 1:
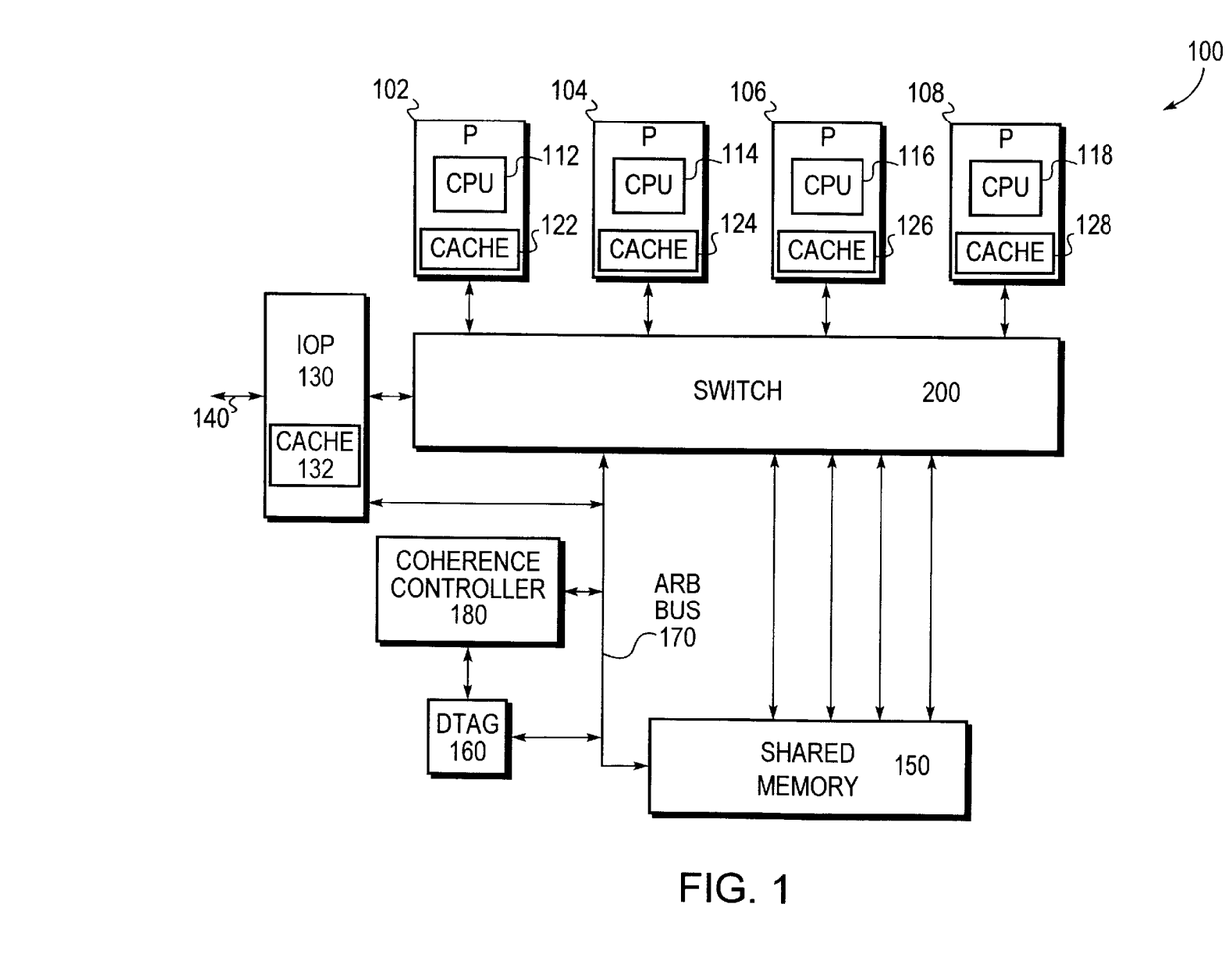
FIG. 1 is a schematic block diagram of a multiprocessor system comprising a plurality of processors coupled to a memory by a local switch.

FIG. 1 is a schematic block diagram of a multiprocessing system, such as a symmetric multiprocessor (SMP) system 100, comprising a plurality of processors (P) 102–108 coupled to an input/output (I/O) processor 130 and a memory 150 by a local switch 200. The memory 150 is preferably organized as a single address space that is shared by the processors and apportioned into a number of blocks, each of which may include, e.g., 64 bytes of data. The I/O processor, or IOP 130, controls the transfer of data between external devices (not shown) and the system via an I/O bus 140. Data is transferred between the components of the SMP system in the form of packets. As used herein, the term "system" refers to all components of the SMP system excluding the processors and IOP. In an embodiment of the invention, the I/O bus may operate according to the conventional Peripheral Computer Interconnect (PCI) protocol.

Each processor is a modern processor comprising a central processing unit (CPU), denoted 112–118, that preferably incorporates a traditional reduced instruction set computer (RISC) load/store architecture. In the illustrative embodiment described herein, the CPUs are Alpha® 21264 processor chips manufactured by Digital Equipment Corporation®, although other types of processor chips may be advantageously used. The load/store instructions executed by the processors are issued to the system as read and write, i.e., memory reference, operations. Each operation may comprise a series of commands (or command packets) that are exchanged between the processors and the system. As described further herein, characteristics of modern processors include the ability to issue memory reference operations out-of-order, to have more than one memory reference outstanding at a time and to accommodate completion of the memory reference operations in arbitrary order.

In addition, each processor and IOP employs a private cache (denoted 122–128 and 132, respectively) for storing data determined likely to be accessed in the future. The caches are preferably organized as write-back caches apportioned into, e.g., 64-byte cache lines accessible by the processors; it should be noted, however, that other cache organizations, such as write-through caches, may be used in connection with the principles of the invention. It should be further noted that memory reference operations issued by the processors are preferably directed to a 64-byte cache line granularity. Since the IOP 130 and processors 102–108 may update data from their private caches without updating shared memory 150, a cache coherence protocol is utilized to maintain consistency among the caches.

The cache coherence protocol of the illustrative embodiment is preferably a conventional write-invalidate, ownership-based protocol. "Write-Invalidate" implies that when a processor modifies a cache line, it invalidates stale copies in other processors' caches rather than updating them with the new value. The protocol is termed an "ownership protocol" because there is always an identifiable owner for a cache line, whether it is shared memory, one of the processors or the IOP entities of the system. The owner of the cache line is responsible for supplying the up-to-date value of the cache line when requested. A processor/IOP may own a cache line in one of two states: "exclusively" or "shared". If a processor has exclusive ownership of a cache line, it may update it without informing the system. Otherwise, it must inform the system and potentially invalidate copies in the other caches.

A shared data structure 160 is provided for capturing and archiving status information corresponding to the states of data used by the system. In the illustrative embodiment, the shared data structure is configured as a conventional duplicate tag store (DTAG) 160 that cooperates with the individual caches of the system to define the coherence protocol states of the data in the system. The protocol states of the DTAG 160 are administered by a coherence controller 180, which may be implemented as a plurality of hardware registers and combinational logic configured to produce a sequential logic circuit, such as a state machine. It should be noted, however, that other configurations of the controller and shared data structure may be advantageously used herein.

Figure 2:
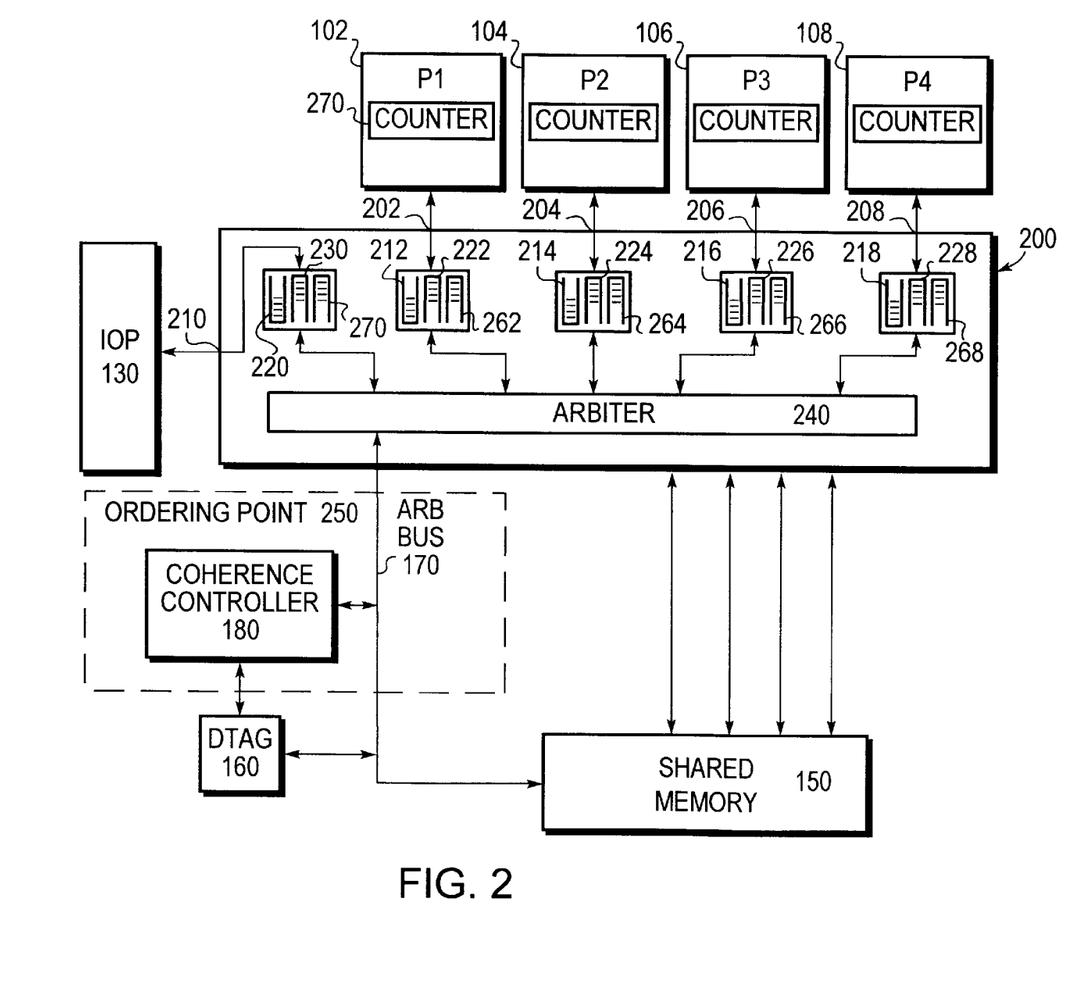
FIG. 2 is a schematic block diagram of the local switch comprising a plurality of ports coupled to the respective processors of FIG. 1.

The DTAG 160, coherence controller 180, IOP 130 and shared memory 150 are interconnected by a logical bus referred to an Arb bus 170. Memory reference operations issued by the processors are routed via the local switch 200 to the Arb bus 170. The Arb bus 170 functions as a serialization point for all memory reference operations issued to the system. That is, the order in which the actual memory reference commands appear on the Arb bus is the order in which processors perceive the results of those commands. In accordance with this embodiment of the invention, though, the Arb bus 170 and the coherence controller 180 further cooperate to provide an ordering point, as described herein. It is also a property of the illustrative cache coherence protocol that the Arb bus 170 and coherence controller 180 are the ordering point for all memory reference commands issued within the system to a particular address, such as address x.

The commands described herein are defined by the Alpha® memory system interface and may be classified into three types: requests, probes, and responses. Requests are commands that are issued by a processor when, as a result of executing a load or store instruction, it must obtain a copy of data. Requests are also used to gain exclusive ownership to a data item (cache line) from the system. Requests include Read (Rd) commands, Read/Modify (RdMod) commands, Change-to-Dirty (CTD) commands, Victim commands, and Evict commands, the latter of which specify removal of a cache line from a respective cache.

Probes are commands issued by the system to one or more processors requesting data and/or cache tag status updates. Probes include Forwarded Read (Frd) commands, Forwarded Read Modify (FRdMod) commands and Invalidate (Inval) commands. When a processor P issues a request to the system, the system may issue one or more probes (via probe packets) to other processors. For example if P requests a copy of a cache line (a Rd request), the system sends a probe to the owner processor (if any). If P requests exclusive ownership of a cache line (a CTD request), the system sends Inval probes to one or more processors having copies of the cache line. If P requests both a copy of the cache line as well as exclusive ownership of the cache line (a RdMod request) the system sends a FRd probe to a processor currently storing a dirty copy of a cache line of data. In response to the Frd probe, the dirty copy of the cache line is returned to the system. A FRdMod probe is also issued by the system to a processor storing a dirty copy of a cache line. In response to the FRdMod probe, the dirty cache line is returned to the system and the dirty copy stored in the cache is invalidated. An Inval probe may be issued by the system to a processor storing a copy of the cache line in its cache when the cache line is to be updated by another processor.

Responses are commands from the system to processors/IOPs which carry the data requested by the processor or an acknowledgment corresponding to a request. For Rd and RdMod requests, the response is a Fill and FillMod response, respectively, each of which carries the requested data. For a CTD request, the response is a CTD-Success (Ack) or CTD-Failure (Nack) response, indicating success or failure of the CTD, whereas for a Victim request, the response is a Victim-Release response.

FIG. 2 is a schematic block diagram of the local switch 200 comprising a plurality of ports 202–210, each of which is coupled to a respective processor (P1–P4) 102–108 and IOP 130 via a full-duplex, bi-directional clock forwarded data link. Each port includes a first-in, first-out (FIFO) input and output queue set; that is, each port includes a respective input (request) queue 212–220 for receiving, e.g., a memory reference request issued by its processor, a respective output (probe) queue 222–230 for receiving, e.g., a memory reference probe issued by system control logic associated with the switch, and a respective output (fill) queue 262–270 for receiving, e.g., requested data provided by another processor of the system. An arbiter 240 arbitrates among the input queues to grant access to the Arb bus 170 where the requests are ordered into a memory reference request stream. In the illustrative embodiment, the arbiter selects the requests stored in the input queues for access to the bus in accordance with an arbitration policy, such as a conventional round-robin algorithm.

The following example illustrates the typical operation of multiprocessing system including switch 200. A Rd request for data item x is received at the switch 200 from P1 and loaded into input queue 212. The arbiter 240 selects the request in accordance with the arbitration algorithm. Upon gaining access to the Arb bus 170, the selected request is routed to the ordering point 250 wherein the states of the corresponding cache lines are interrogated in the DTAG 160. Specifically, the coherence controller 180 examines the DTAG to determine which entity of the system "owns" the cache line and which entities have copies of the line. If processor P3 is the owner of the cache line x and P4 has a copy, the coherence controller generates the necessary probes (e.g., a Fill x and Inval x) and forwards them to the output probe queues 226 and 228 for transmission to the processors.

Because of operational latencies through the switch and data paths of the system, memory reference requests issued by P1 may complete out-of-order. In some cases, out-of-order completion may affect the consistency of data in the system, particularly for updates to a cache line. Memory consistency models provide formal specifications of how such updates become visible to the entities of the multiprocessor system. In the illustrative embodiment of the present invention, a weak ordering, consistency model is described.

In a weakly-ordered system, inter-reference ordering is typically imposed by a memory barrier (MB) instruction inserted between memory reference instructions of a program executed by a processor. The MB instruction separates and groups those instructions of a program that need ordering from the rest of the instructions. The semantics of weak ordering mandate that all pre-MB memory reference operations are logically ordered before all post-MB references. For example, the following program instructions are executed by P1 and P2:

| P1 | P2 |
|---|---|
| St x | Ld flag, 0 |
| St y | MB |
| St z | Rd x |
| MB | Rd y |
| St flag, 0 | Rd z |

In the case of P1's program, it is desired to store (via a write operation) all of the data items x, y and z before modifying the value of the flag; the programmer indicates this intention by placing the MB instruction after St z. According to the weak-ordering semantics, the programmer doesn't care about the order in which the pre-MB store instructions issue as memory reference operations, nor does she care about the order in which the post-MB references appear to the system. Essentially, the programmer only cares that every pre-MB store instruction appears before every post-MB instruction. At P2, a load (via a read operation) flag is performed to test for the value 0. Testing of the flag is ordered with respect to acquiring the data items x, y and z as indicated by the MB instruction. Again, it is not necessary to impose order on the individual post-MB instructions.

To ensure correct implementation of the consistency model, prior systems inhibit the issuance of the MB operation and all post-MB operations until actual completion of all pre-MB operations have been confirmed to the processor. Maintaining inter-reference order from all pre-MB operations to all post-MB operations typically requires acknowledgment responses and/or return data to signal completion of the pre-MB operations. The acknowledgment responses and/or data may be gathered and sent to the processor issuing the operations. The pre-MB operations are considered completed only after all responses and data are received by the requesting processor. Thus, referring to the example above with respect to operation of a prior multiprocessing system, once P1 has received the data and acknowledgment responses (e.g., an Inval acknowledgment) corresponding to an operation, the operation is considered complete.

However, each memory reference operation may consist of a number of commands; the latency of inter-reference ordering is a function of the extent to which each command must complete before the reference is considered ordered. The present invention relates to a technique for reducing the latency of a memory barrier (MB) operation used to impose an inter-reference order between sets of memory reference operations issued by a processor to a multiprocessor system having a shared memory. The technique comprises issuing the MB operation immediately after issuing a first set of memory reference operations (i.e., the pre-MB operations) without waiting for responses to those pre-MB operations, thereby reducing the latency of the MB operation.

Referring again to the above example including the program instructions executed by P1, generation of the MB-Ack in response to the MB operation issued by P1 occurs upon successful arbitration and access to the Arb bus 170, and serializing of that request with respect to all memory reference requests appearing on the bus. Specifically, all memory reference requests issued by the processors of the system that appear on the bus, including the pre-MB operations issued by P1, are serialized by the ordering point 250, which also determines the state of the requested data items throughout the system. The ordering point further generates probes (i.e., probe and invalidate packets) to invalidate copies of the data and to request forwarding of the data from an owner to a requesting processor.

Figure 3:
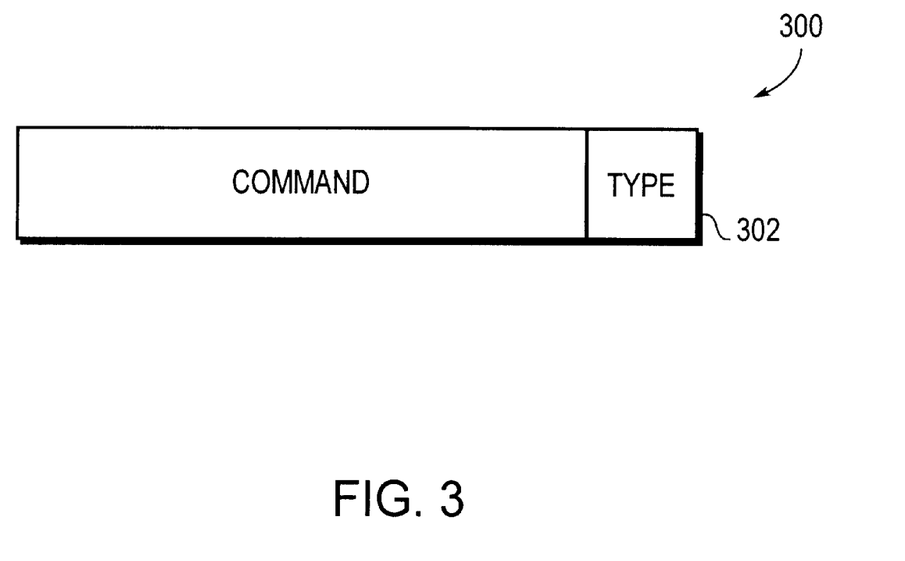
FIG. 3 is a schematic diagram of an embodiment of a memory barrier (MB) acknowledgment implemented as a probe-type packet.

FIG. 3 is a schematic diagram of an embodiment of a MB-Ack 300 implemented as a command packet that is advantageously used with the present invention. Specifically, a type field 302 specifies that the packet is of a MB-Ack packet 300. The MB-Ack 300 is loaded into a probe queue of the issuing processor and, according to the invention, functions to "pull-in" all previously serialized invalidate and probe commands in that queue. By ensuring that the probes and invalidates are ordered before the MB-Ack is received at the issuing processor, the inventive technique provides the appearance that all pre-MB operations have completed.

For example, in response to a serialized request (such as RdMod) issued by P3, the ordering point 250 generates a FRdMod x probe to P1 (i.e., the owner) and Inval x probes to P2 and P4. The probe and invalidate packets are loaded into the output probe queues and forwarded to the respective processors in single, FIFO order. Specifically, the coherence controller 180 and Arb bus 170 cooperate to (i) serialize a request selected by the arbiter 240, (ii) generate the probes required by the request and (iii) substantially simultaneously load those probes into their respective probe queues; these steps are preferably executed as an atomic operation that ensures serialization of memory reference operations at the ordering point.

Thereafter P1 issues the MB operation after issuing all of the pre-MB (RdMod) requests for data items x, y and z (corresponding to each store instruction for those data items). Notably, the MB is loaded into the request queue immediately after the pre-MB requests, without waiting for any acknowledgments or data for pre-MB requests. Upon serializing the MB operation, the ordering point 250 generates an MB-Ack 300 and loads it into the probe queue of the P1. The atomic ordering process ensures that the MB-Ack is loaded into the probe queue after all previously ordered invalidates and probes directed to the processor's cache. Significantly, the MB-Ack is loaded into the probe queue and not the fill queue; therefore, P1 does not have to wait for the actual fill data to issue the MB operation or any post-MB operations, as required in the prior art. This aspect of the invention provides a substantial system performance enhancement.

Figure 4:
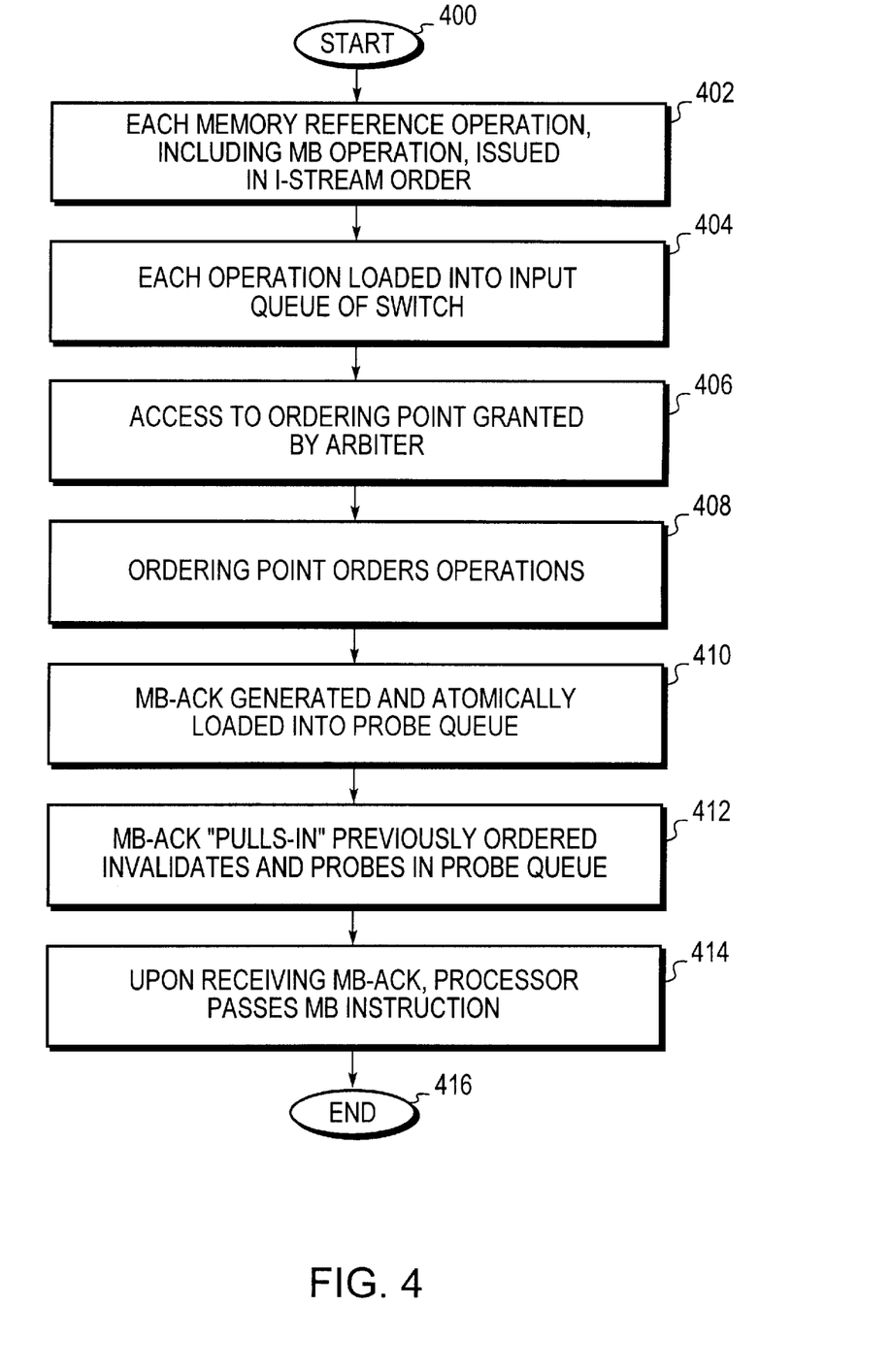
FIGS. 4 and 5 are flowcharts illustrating steps for implementing a novel technique for reducing the latency of a MB operation in accordance with the present invention.

FIG. 4 is a flowchart illustrating the sequence of steps for implementing the novel technique for reducing the latency of a MB operation in accordance with the present invention. The sequence starts at Step 400 and proceeds to Step 402 where a processor issues each memory reference operation, including the MB operation, to the system in the I-stream order of its program. In Step 404, each operation is loaded into a FIFO input queue of the switch in the order issued by the processor. In Step 406, an arbiter of the switch arbitrates among all of the input queues to grant access to the ordering point and, in Step 408, the ordering point serializes ("orders") the operations into a memory reference request stream. Upon ordering of the MB operation, the ordering point generates an MB-Ack and atomically loads it into the probe queue of the issuing processor (Step 410). As a result of the atomic ordering process, the MB-Ack is loaded into the FIFO probe queue after all previously ordered invalidates and probes directed to the processor's cache. In Step 412, the MB-Ack functions to "pull-in" all previously serialized invalidate and probe commands in the probe queue; that is, the previously ordered invalidates and probes are sent to the processor and applied to the processor's cache before the MB-Ack is received by the processor. Upon receiving the MB-Ack in Step 414, the processor continues program execution beyond the MB instruction. The sequence then ends in Step 416.

Figure 5:
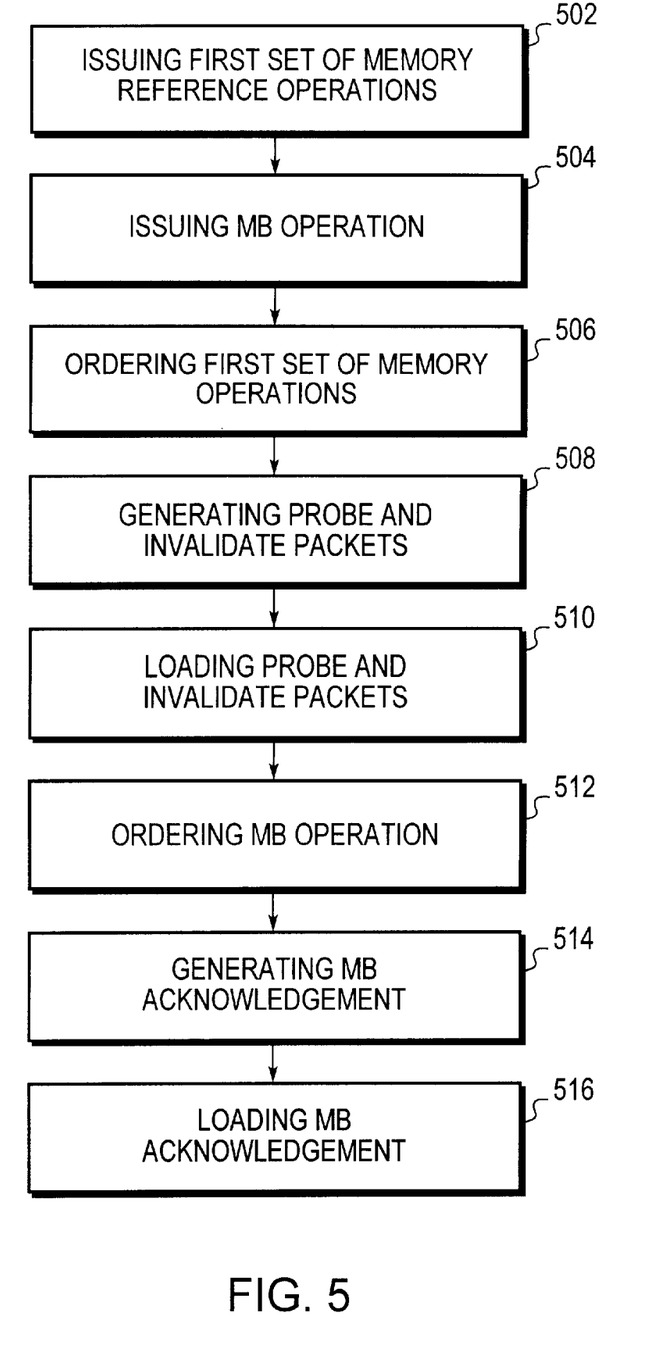

Described somewhat differently, the novel technique for reducing the latency of a MB operation in accordance with the present invention may have the sequence of steps 500 illustrated in FIG. 5. As shown in FIG. 5, the sequence starts at step 502, in which a first processor of the multiprocessor system issues a first set of memory reference instructions to the system control logic. Thereafter, the sequence continues to step 504, in which the MB operation is issued from the first processor to the system control logic immediately after issuing of the first set of memory reference operations, without waiting for responses to the first set of memory reference operations to arrive at the first processor. After step 504, the sequence continues to step 506 wherein the first set of memory reference operations is ordered with respect to other memory reference operations issued by other processors of the system, at an ordering point of a switch. Probe and invalidate packets are then generated for the ordered first set of memory reference operations at the ordering point (See, step 508). The probe and invalidate packets are then loaded into probe queues of the first and other processors for transmission to those processors (See, step 510). After step 510, the sequence continues to step 512, wherein the MB operation is ordered at the ordering point after the ordering of the first set of memory reference operations. A MB acknowledgement is then generated in response to the ordered MB operation (See, step 514). Thereafter, the MB acknowledgement is loaded into the probe queue of the first processor for transmission to the first processor. When loaded, the MB acknowledgement pulls in all previously ordered validate and probe commands in the probe queue of the first processor (See, step 516).

Clearly, the reduction in latency is an advantage of the novel technique, particularly with respect to the latencies associated with the various data paths to the processors. In addition, some processors may be busier than others, resulting in longer delays for responses and/or data, but in the prior art the requesting processor must wait for the longest one. Also, the novel technique results in propagation of less commands through the system and a reduction in resources.

While there has been shown and described an illustrative embodiment for reducing the latency of a MB operation used to impose an inter-reference order between sets of memory reference operations in a multiprocessor system having a shared memory, it is to be understood that various other adaptations and modifications may be made within the spirit and scope of the invention. For example in an alternate embodiment of the invention, there may be multiple banks of the shared memory and multiple request queues per processor; in particular, there is one request queue per bank of shared memory. Here, the memory reference operations, including the MB operation, issued by a processor are issued in I-stream order to the request queues and after all of the pre-MB memory reference operations gain access to the bus, then the MB operation is allowed to arbitrate to gain access. As a further example when a processor issues an MB operation that is loaded into any one of its request queues, the MB operation does not gain access to the Arb bus until all memory reference operations pending in all of the processor's other request queues have successfully arbitrated for access to the bus and have been ordered by the ordering point 250. The arbitration policy executed by the arbiter 240 is thus configured to consider the activity per bank, i.e., the arbitration algorithm keeps track of which banks are busy. Another way of implementing the arbitration policy is to ensure that all of the processor's request queues are empty before allowing the MB operation to arbitrate for the bus. In any event after all the pending memory reference operations have been ordered, the MB operation arbitrates for the Arb bus and, in response to acquiring bus access, the coherence controller 180 of the ordering point 250 generates an MB-Ack 300 which, as described above, is loaded into the processor's probe queue and functions to "pull-in" all previously enqueued probes and invalidates originating from other processors of the system.

In yet another alternate embodiment of the invention, configurations of the SMP system switch may include any conventional bus-based topology. For each such alternate embodiment, there may be ordering point logic associated with the bus structure having the above-described ordering properties for generating and transmitting MB-Acks upon the atomic ordering of MB operations.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for reducing the latency of a memory barrier (MB) operation used to impose an inter-reference order between sets of memory reference operations issued by a first processor to a multiprocessor system having a plurality of processors and a shared memory interconnected by a system control logic, the method comprising:

issuing a first set of memory reference operations from the first processor to the system control logic;

issuing the MB operation from the first processor to the system control logic immediately after issuing the first set of memory reference operations without waiting for responses to the first set of memory reference operations to arrive at the first processor;

ordering the first set of memory reference operations with respect to other memory reference operations issued by other processors of the system at an ordering point of a switch;

generating probe and invalidate packets for the ordered first set of memory reference operations at the ordering point;

loading the probe and invalidate packets into probe queues of the first and other processors for transmission to those processors;

ordering the MB operation at the ordering point after ordering of the first set of memory reference operations;

generating a MB acknowledgment (MB-Ack) in response to the ordered MB operation; and     loading the MB-Ack into the probe queue of the first processor for transmission to the first processor, the loaded MB-Ack pulling-in all previously ordered invalidate and probe commands in the probe queue of the first processor.

2. The method of claim 1 wherein the step of issuing the first set of memory reference operations comprises the step of loading the first set of memory reference operations into a first-in, first-out request queue of the system control logic.

3. The method of claim 2 wherein the step of ordering the first set of memory reference operations with respect to other memory reference operations issued by other processors of the system comprises the step of serializing each operation selected by an arbiter of the system control logic in accordance with an arbitration policy.

4. The method of claim 1 wherein the shared memory comprises a plurality of banks and wherein the step of issuing the first set of memory reference operations comprises the step of loading the first set of memory reference operations into a plurality of first-in, first-out request queues of the system control logic, each request queue associated with a respective processor and a respective shared memory bank.

5. The method of claim 4 wherein the step of ordering the MB operation at the ordering point after ordering of the first set of memory reference operations comprises the step of serializing the MB operation selected by an arbiter of the system control logic in accordance with an arbitration policy.

6. The method of claim 5 wherein the arbitration policy considers activity per shared memory bank.

7. The method of claim 5 wherein the arbitration policy prevents the MB operation from gaining access to the ordering point until all memory reference operations pending in the request queues associated with the first processor have accessed the ordering point.

* * * * *